(12) United States Patent
Fang (10) Patent No.: US 8,305,776 B2
(45) Date of Patent: Nov. 6, 2012

(54) SYSTEMS AND METHODS FOR PRIMARY-SIDE REGULATION IN OFF-LINE SWITCHING-MODE FLYBACK POWER CONVERSION SYSTEM

(75) Inventor: Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 509 days.

(21) Appl. No.: 12/502,866

(22) Filed: Jul. 14, 2009

(65) Prior Publication Data

US 2010/0027300 A1    Feb. 4, 2010

Related U.S. Application Data

(60) Provisional application No. 61/084,982, filed on Jul. 30, 2008.

(51) Int. Cl.
*H02M 3/335* (2006.01)
(52) U.S. Cl. ...................... 363/21.16; 307/103
(58) Field of Classification Search .... 363/21.12–21.18, 363/21.08, 18, 19; 307/103
See application file for complete search history.

(56) References Cited

U.S. PATENT DOCUMENTS

2007/0115696 A1*  5/2007  Berghegger ............... 363/16
2007/0171687 A1*  7/2007  Kogel et al. ................ 363/49

* cited by examiner

*Primary Examiner* — Harry Behm
*Assistant Examiner* — Matthew Grubb
(74) *Attorney, Agent, or Firm* — Jones Day (57) ABSTRACT

Switching-mode power conversion system and method thereof. The system includes a primary winding configured to receive an input voltage, an a secondary winding coupled to the primary winding and configured to, with one or more first components, generate, at an output terminal, an output voltage and an output current. Additionally, the system includes an auxiliary winding coupled to the secondary winding and configured to, with one or more second components, generate, at a first terminal, a detected voltage. Moreover, the system includes an error amplifier configured to receive the detected voltage and a first reference voltage and generate an amplified voltage based on at least information associated with a difference between the detected voltage and the first reference voltage. Also, the system includes a compensation component configured to receive the amplified voltage and generate a second reference voltage based on at least information associated with the amplified voltage.

22 Claims, 9 Drawing Sheets

SYSTEMS AND METHODS FOR PRIMARY-SIDE REGULATION IN OFF-LINE SWITCHING-MODE FLYBACK POWER CONVERSION SYSTEM

1. CROSS-REFERENCES TO RELATED APPLICATIONS

This application claims priority to U.S. Provisional No. 61/084,982, filed Jul. 30, 2008, commonly assigned, incorporated by reference herein for all purposes.

2. BACKGROUND OF THE INVENTION

The present invention is directed to switching-mode power conversion systems. More particularly, the invention provides systems and methods for primary-side regulation with load compensation. Merely by way of example, the invention has been applied to off-line switching-mode flyback power conversion systems. But it would be recognized that the invention has a much broader range of applicability.

Flyback converters have been used extensively for its simple structure and low cost in low-power power supplies. But in conventional flyback converters, the output-voltage regulation is often performed with secondary-side feedback, using an isolated arrangement of opto-coupler and shunt regulator (e.g., TL431). Such arrangement usually increases the system cost, size, and power consumption.

Figure 1:
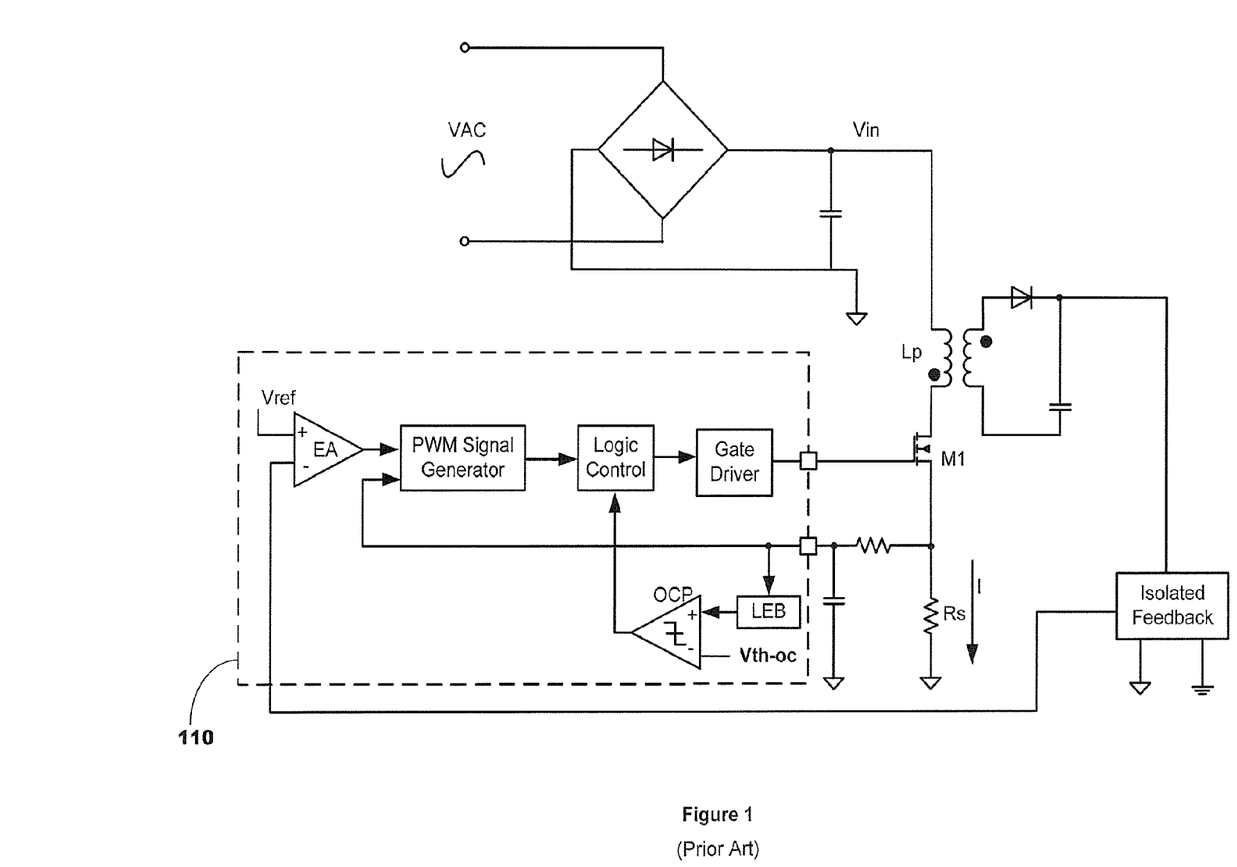
FIG. 1 is a simplified diagram showing a conventional flyback switching-mode power conversion system with secondary-side control.

FIG. 1 is a simplified diagram showing a conventional flyback switching-mode power conversion system with secondary-side control. As shown in FIG. 1, a PWM controller 110 is used to control and drive a power MOSFET, M1, which turns on and off to control the power delivered to the load on the secondary side.

To reduce the system cost and size of the flyback switching-mode power conversion system, the converter that employs the primary-side regulation has become popular for certain applications. In the primary-side regulation, the output voltage is sensed by detecting the voltage of the auxiliary winding that is tightly coupled to the secondary winding. Since the voltage of the auxiliary winding should image the output voltage associated with the secondary winding, the detected voltage can be utilized to regulate the secondary-side output voltage. Hence, the expensive parts of opto-coupler and shunt regulator (e.g., TL431) often are no longer needed in order to save system cost and size.

Figure 2A:
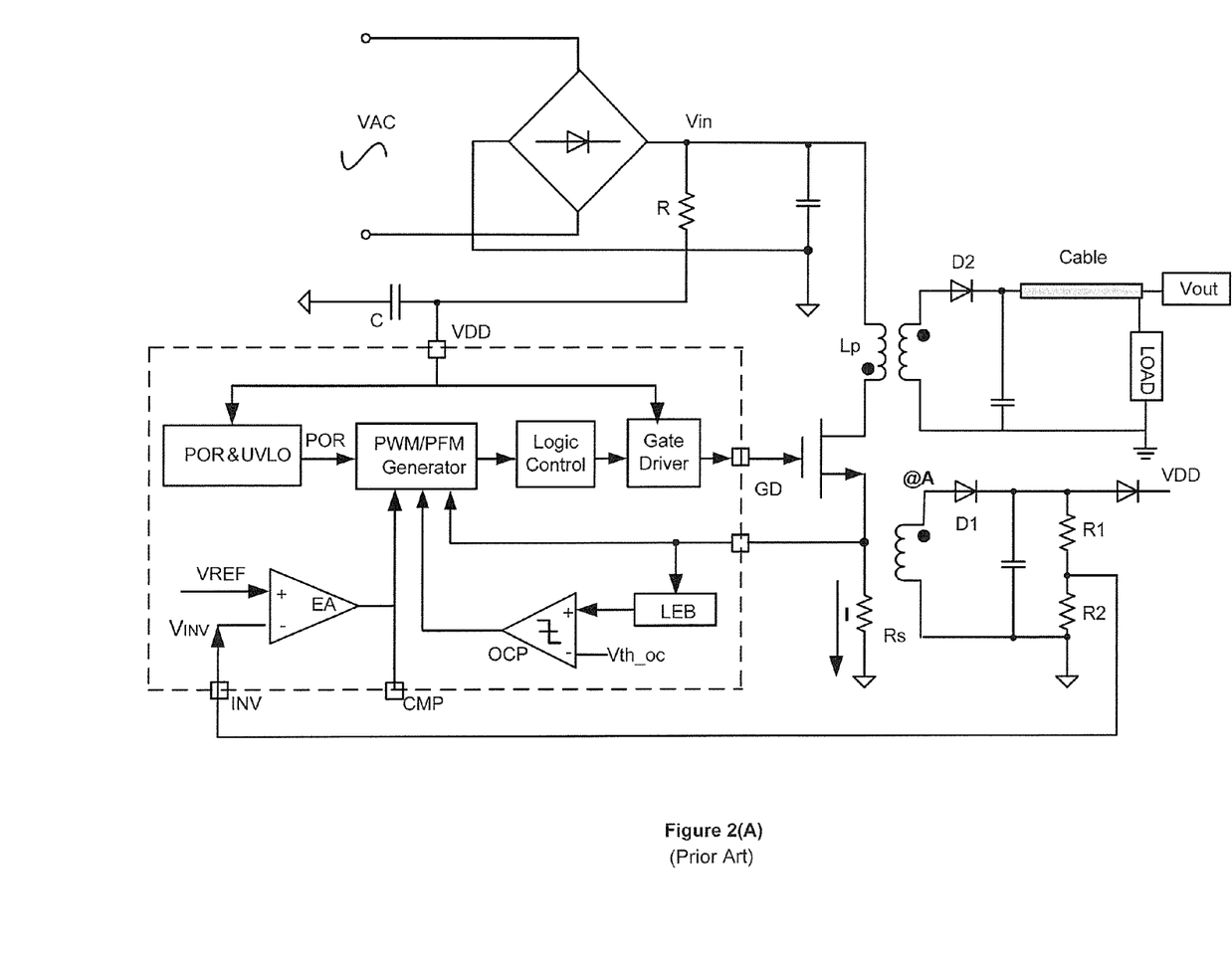
FIG. 2(A) is a diagram showing a conventional flyback switching-mode power conversion system with primary-side control.

FIG. 2(A) is a diagram showing a conventional flyback switching-mode power conversion system with primary-side control. The output voltage $V_{out}$ is mapped to the voltage signal $V_{INV}$ at node INV. The adjustment of $V_{INV}$ often results in the regulation of Vout.

For the primary-side regulation, relationship between $V_{INV}$ and $V_{out}$ can be expressed as follows.

$$V_{INV} = \frac{n \times R_2}{R_1 + R_2}(V_{out} + V_{D2}) - \frac{R_2}{R_1 + R_2}V_{D1} \quad (1)$$

where n is the turn ratio of the auxiliary winding to the secondary winding. $V_{D1}$ and $V_{D2}$ are the forward voltages across diodes D1 and D2.

Setting $$k = \frac{R_1 + R_2}{n \times R_2},$$

$V_{out}$ is therefore given by:

$$V_{out} = k \times V_{INV} + \frac{1}{n}V_{D1} - V_{D2} \quad (2)$$

The output voltage is regulated through the regulation of the voltage of the auxiliary winding. For example, the sensed voltage, $V_{INV}$, is compared with the predetermined voltage level, $V_{REF}$. The difference between $V_{INV}$ and $V_{REF}$, the error signal, is processed by the error amplifier to generate the amplified error signal. Based at least in part on the amplified error signal, the PWM/PFM signal is generated. The PWM/PFM signal controls turning on/off of the power switch thus the power delivered to the secondary side. As a result, the difference between $V_{INV}$ and $V_{REF}$ becomes smaller and smaller, and at the end, $V_{INV}$ should equal to $V_{REF}$.

Since $V_{INV}$ is the image of the output voltage, $V_{out}$, the output voltage is proportional to $V_{INV}$, thus $V_{REF}$ under certain conditions. Specifically, the output voltage is regulated at a constant level if the forward voltages across diodes D1 and D2 are constant, as shown below.

$$V_{out} = k \times V_{REF} + \frac{1}{n}V_{D1} - V_{D2} \quad (3)$$

However, for a given diode, the forward voltage is current dependent; hence $V_{D2}$ changes if the load current changes. In contrast, $V_{D1}$ can remain almost constant because the current that flows through the diode D1 changes little when the output load current changes.

Moreover, the voltage drop across the output cable line is also proportional to the output load current. Therefore, the scheme as described above often has poor load-voltage regulation due to the voltage drops of the diode D2 and the output cable line.

Assuming resistance of the output cable line is r, we have $$V_{out} = k \times V_{REF} + \frac{1}{n}V_{D1} - V_{D2} - I_o \times r \quad (4)$$

where $I_o$ is the output load current. Since different magnitudes of the load current result in different voltage drops of the diode D2 and the output cable line, the output voltage $V_{out}$ is not constant at various output current levels. The output voltage $V_{out}$ decreases as the output current $I_o$ increases.

Figure 2B:
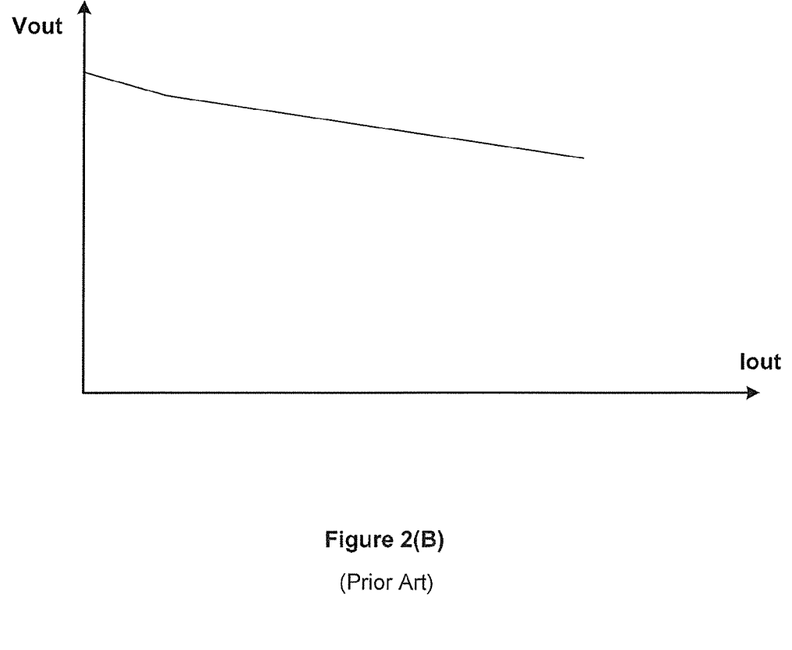
FIG. 2(B) is a simplified diagram showing conventional output characteristics of a conventional flyback switching-mode power conversion system with primary-side control.

FIG. 2(B) is a simplified diagram showing conventional output characteristics of a conventional flyback switching-mode power conversion system with primary-side control. As shown in FIG. 2(B), the output voltage decreases as the output load current increases. Often, the load regulation variation in such scheme is about 10% which usually cannot meet the requirements of most applications.

Therefore, it is highly desirable to improve techniques for output voltage regulation.

3. BRIEF SUMMARY OF THE INVENTION

The present invention is directed to switching-mode power conversion systems. More particularly, the invention provides systems and methods for primary-side regulation with load compensation. Merely by way of example, the invention has been applied to off-line switching-mode flyback power conversion systems. But it would be recognized that the invention has a much broader range of applicability.

According to one embodiment of the present invention, a switching-mode power conversion system includes a primary winding configured to receive an input voltage, and a secondary winding coupled to the primary winding and configured to, with one or more first components, generate, at an output terminal, an output voltage and an output current. Additionally, the system includes an auxiliary winding coupled to the secondary winding and configured to, with one or more second components, generate, at a first terminal, a detected voltage. Moreover, the system includes an error amplifier configured to receive the detected voltage and a first reference voltage and generate an amplified voltage based on at least information associated with a difference between the detected voltage and the first reference voltage. Also, the system includes a compensation component configured to receive the amplified voltage and generate a second reference voltage based on at least information associated with the amplified voltage, and a summation component configured to receive the second reference voltage and a predetermined reference voltage and generate the first reference voltage. Additionally, the system includes a signal generator configured to receive at least the amplified voltage and generate one or more control signals based on at least information associated with the amplified voltage, a gate driver configured to receive the one or more control signals and generate a drive signal based on at least information associated with the one or more control signals, and a switch configured to receive the drive signal and affect a first current flowing through the primary winding. The one or more first components include a first diode, through at least the first diode the secondary winding being coupled to the output terminal. The compensation component is further configured to generate the second reference voltage such that the output voltage is substantially independent of the output current.

According to another embodiment of the present invention, a switching-mode power conversion system includes a primary winding configured to receive an input voltage, and a secondary winding coupled to the primary winding and configured to, with one or more first components, generate, at an output terminal, an output voltage and an output current. Additionally, the system includes an auxiliary winding coupled to the secondary winding and configured to, with at least one or more second components, generate, at a first terminal, a detected voltage. Moreover, the system includes an error amplifier configured to receive the detected voltage and a predetermined reference voltage and generate an amplified voltage based on at least information associated with a difference between the detected voltage and the predetermined reference voltage. Also, the system includes a compensation component configured to receive the amplified voltage and generate a compensation current based on at least information associated with the amplified voltage, the compensation current flowing between the first terminal and the compensation component. Additionally, the system includes a signal generator configured to receive at least the amplified voltage and generate one or more control signals based on at least information associated with the amplified voltage, a gate driver configured to receive the one or more control signals and generate a drive signal based on at least information associated with the one or more control signals, and a switch configured to receive the drive signal and affect a first current flowing through the primary winding. The one or more first components include a first diode, through at least the first diode the secondary winding being coupled to the output terminal. The compensation component is further configured to generate the compensation current such that the output voltage is substantially independent of the output current.

According to yet another embodiment of the present invention, a method for regulating an output voltage by a switching-mode power conversion system includes receiving an input voltage by a primary winding. Additionally, the method includes generating, at an output terminal, an output voltage and an output current based on at least information associated with the input voltage, by a secondary winding and one or more first components, the one or more first components including a first diode, through at least the first diode the secondary winding being coupled to the output terminal. Moreover, the method includes generating, at a first terminal, a detected voltage based on at least information associated with the output voltage, by an auxiliary winding and one or more second components. Also, the method includes receiving the detected voltage and a first reference voltage by an error amplifier, generating an amplified voltage based on at least information associated with a difference between the detected voltage and the first reference voltage, and receiving the amplified voltage by a compensation component. Additionally, the method includes generating a second reference voltage based on at least information associated with the amplified voltage, receiving the second reference voltage and a predetermined reference voltage by a summation component, and generating the first reference voltage equal to the second reference voltage and a predetermined reference voltage in magnitude. Moreover, the method includes receiving at least the amplified voltage by a signal generator, generating one or more control signals based on at least information associated with the amplified voltage, receiving the one or more control signals by a gate driver, and generating a drive signal based on at least information associated with the one or more control signals. Also, the method includes receiving the drive signal by a switch, and affecting a first current flowing through the primary winding, based on at least information associated with the drive signal. The process for generating a second reference voltage is performed such that the output voltage is substantially independent of the output current.

According to yet another embodiment of the present invention, a method for regulating an output voltage by a switching-mode power conversion system, the method includes receiving an input voltage by a primary winding. Additionally, the method includes generating, at an output terminal, an output voltage and an output current based on at least information associated with the input voltage, by a secondary winding and one or more first components, the one or more first components including a first diode, through at least the first diode the secondary winding being coupled to the output terminal. Moreover, the method includes generating, at a first terminal, a detected voltage based on at least information associated with the output voltage, by an auxiliary winding and one or more second components. Also, the method includes receiving the detected voltage and a predetermined reference voltage by an error amplifier, generating an amplified voltage based on at least information associated with a difference between the detected voltage and the predetermined reference voltage, and receiving the amplified voltage by a compensation component. Additionally, the method includes generating a compensation current based on at least information associated with the amplified voltage, the compensation current flowing between the first terminal and the compensation component. Moreover, the method includes receiving at least the amplified voltage by a signal generator, generating one or more control signals based on at least information associated with the amplified voltage, receiving the one or more control signals by a gate driver, and generating a drive signal based on at least information associated with the one or more control signals. Also, the method includes receiving the drive signal by a switch, and affecting a first current flowing through the primary winding, based on at least information associated with the drive signal. The process for generating a compensation current is performed such that the output voltage is substantially independent of the output current.

Many benefits are achieved by way of the present invention over conventional techniques. Certain embodiments of the present invention reduce parts count and/or system cost. Some embodiments of the present invention improve reliability and/or efficiency. Certain embodiments of the present invention simplify circuit designs. Some embodiments of the present invention improve load regulation of the flyback power conversion system with pulse-width-modulation (PWM) control and primary-side regulation.

Depending upon embodiment, one or more of these benefits may be achieved. These benefits and various additional objects, features and advantages of the present invention can be fully appreciated with reference to the detailed description and accompanying drawings that follow

5. DETAILED DESCRIPTION OF THE INVENTION

The present invention is directed to switching-mode power conversion systems. More particularly, the invention provides systems and methods for primary-side regulation with load compensation. Merely by way of example, the invention has been applied to off-line switching-mode flyback power conversion systems. But it would be recognized that the invention has a much broader range of applicability.

Figure 3:
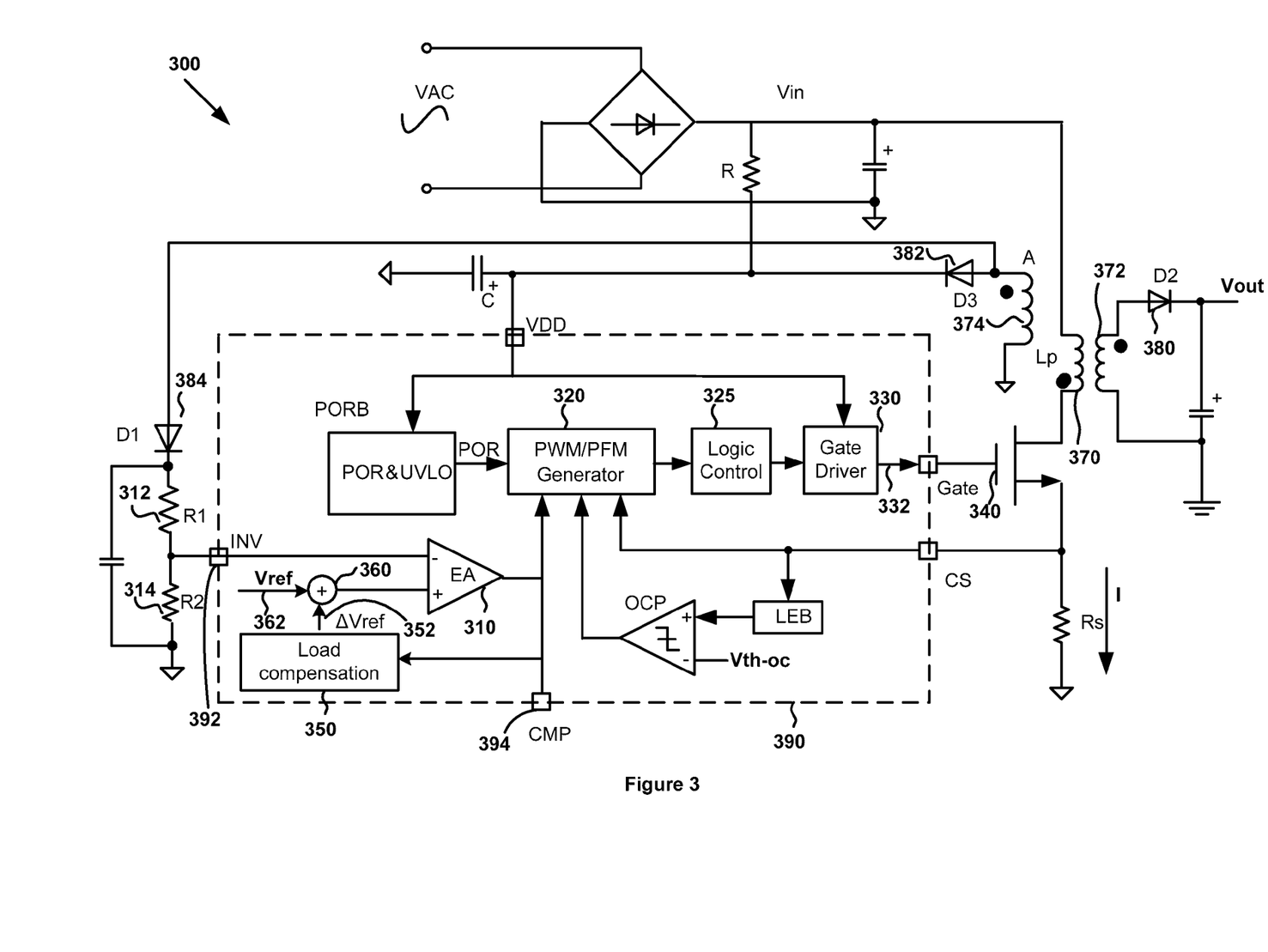
FIG. 3 is a simplified diagram showing a switching-mode power conversion system with primary-side control and load compensation according to one embodiment of the present invention.

FIG. 3 is a simplified diagram showing a switching-mode power conversion system with primary-side control and load compensation according to one embodiment of the present invention. This diagram is merely an example, which should not unduly limit the scope of the claims. One of ordinary skill in the art would recognize many variations, alternatives, and modifications. A switching-mode power conversion system 300 includes an error amplifier 310, resistors 312 and 314, a PWM/PFM generator 320, a logic control component 325, a gate driver 330, a switch 340, a load compensation component 350, a summation component 360, a primary winding 370, a secondary winding 372, an auxiliary winding 374, and diodes 380, 382 and 384. In one embodiment, the components 310, 320, 325, 330, 350, and 360 are located on a chip 390. For example, the chip 390 includes at least terminals 392 and 394.

As shown in FIG. 3, a reference voltage $V_{ref}$ is compensated based on at least the output loading. For example, an output voltage $V_{out}$ is regulated by adjusting $V_{INV}$, which is the voltage at the terminal 392 (i.e., the terminal INV). In another example, the output of the error amplifier 310 is represented by $V_{CMP}$, which is the voltage at the terminal 394 (i.e., the terminal CMP).

The voltage $V_{CMP}$ is received by the PWM/PFM generator 320, which through the logic control component 325 and the gate driver 330 determines the duty cycle of a drive signal 332. The drive signal 332 is received by the switch 340. For example, the switch 340 is an NMOS transistor. In one embodiment, the PWM/PFM generator 320, through the logic control component 325 and the gate driver 330, determines the turn-on time of the switch 340 for the PWM control. In another embodiment, the PWM/PFM generator 320, through the logic control component 325 and the gate driver 330, determines the switching frequency for the pulse-frequency-modulation (PFM) control.

As shown in FIG. 3, higher magnitude of $V_{CMP}$, for example, results in larger duty cycle of the drive signal 332 and thus higher power delivered to the output of the system 300. According to certain embodiments, $V_{CMP}$ reflects the condition of the output loading for the system 300.

Figure 4:
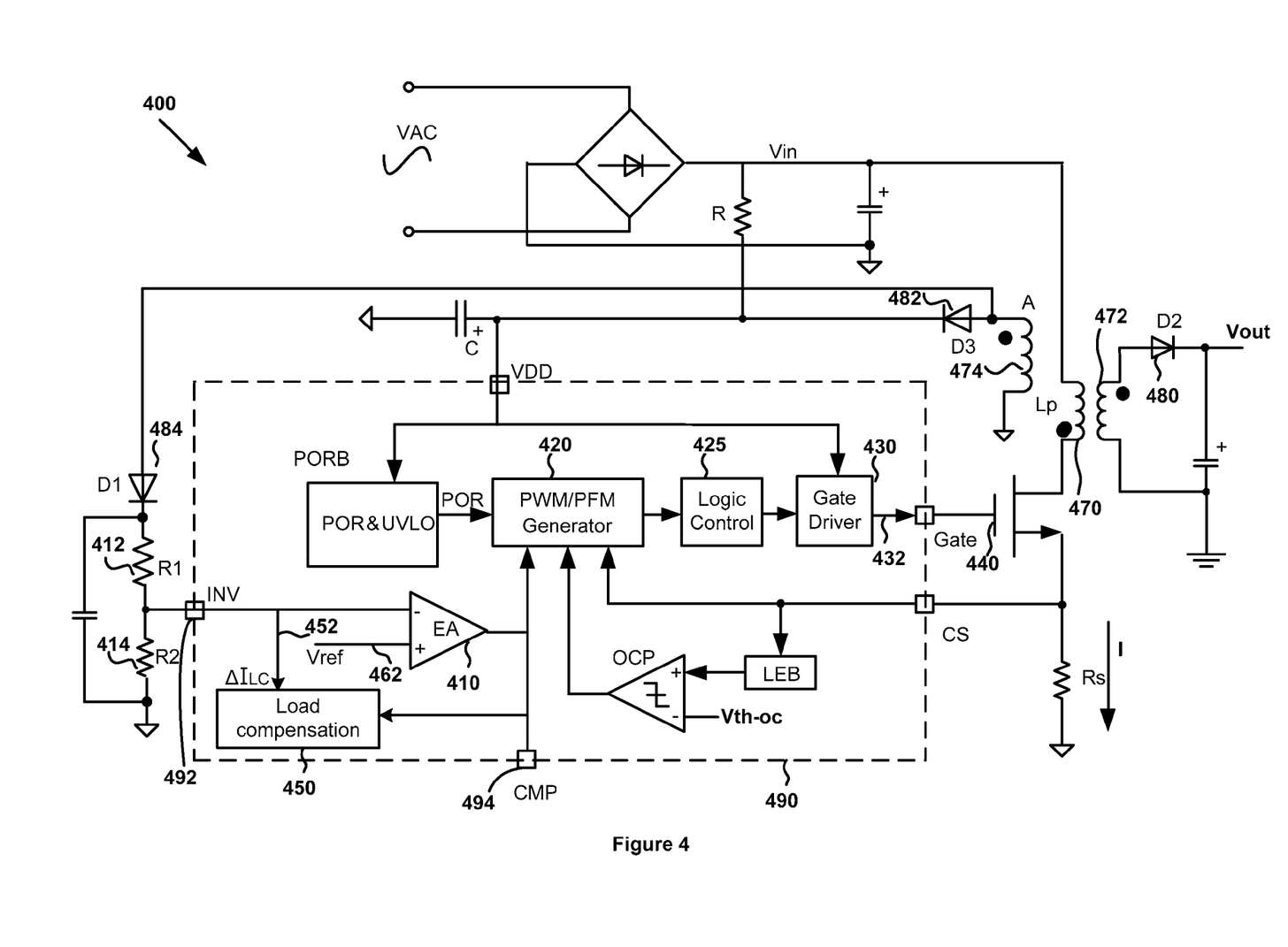
FIG. 4 is a simplified diagram showing a switching-mode power conversion system with primary-side control and load compensation according to another embodiment of the present invention.

FIG. 4 is a simplified diagram showing a switching-mode power conversion system with primary-side control and load compensation according to another embodiment of the present invention. This diagram is merely an example, which should not unduly limit the scope of the claims. One of ordinary skill in the art would recognize many variations, alternatives, and modifications. A switching-mode power conversion system 400 includes at least an error amplifier 410, resistors 412 and 414, a PWM/PFM generator 420, a logic control component 425, a gate driver 430, a switch 440, a load compensation component 450, a primary winding 470, a secondary winding 472, an auxiliary winding 474, and diodes 480, 482 and 484. In one embodiment, the components 410, 420, 425, 430, and 450 are located on a chip 490. For example, the chip 490 includes at least terminals 492 and 494.

As shown in FIG. 4, a voltage $V_{INV}$ at the terminal 492 (i.e., the terminal INV) is compensated based on at least the output loading. For example, an output voltage $V_{out}$ is regulated by adjusting $V_{INV}$. In another example, the output of the error amplifier 410 is represented by $V_{CMP}$, which is the voltage at the terminal 494 (i.e., the terminal CMP).

The voltage $V_{CMP}$ is received by the PWM/PFM generator 420, which through the logic control component 425 and the gate driver 430 determines the duty cycle of a drive signal 432. The drive signal 432 is received by the switch 440. For example, the switch 440 is an NMOS transistor. In one embodiment, the PWM/PFM generator 420, through the logic control component 425 and the gate driver 430, determines the turn-on time of the switch 440 for the PWM control. In another embodiment, the PWM/PFM generator 420, through the logic control component 425 and the gate driver 430, determines the switching frequency for the PFM control.

As shown in FIG. 4, higher magnitude of $V_{CMP}$, for example, results in larger duty cycle of the drive signal 432 and thus higher power delivered to the output of the system 400. According to certain embodiments, $V_{CMP}$ reflects the condition of the output loading for the system 400.

In one embodiment, if the system 300 or 400 operates in the discontinuous-conduction-mode (DCM) with PWM control, the energy stored during the switch-on usually is fully delivered to the output, as shown below.

$$\frac{1}{2} f_0 \times L \times I_{PK}^2 = V_o \times I_o \qquad (5)$$

where $f_0$ is the switching frequency of the signal 332 or 432, and L is the inductance of the primary winding 370 or 470. Additionally, $V_o$ is the output voltage of the system 300 or 400, and $I_o$ is the output current of the system 300 or 400. For example, $V_o$ is the same as $V_{out}$ as shown in FIG. 3 or 4. Also, $I_{PK}$ is the peak current of the primary winding 370 or 470 at, for example, the end of switch-on.

$$\text{Moreover,} \quad I_{PK} = \gamma \times V_{CMP} \qquad (6)$$

where $\gamma$ is a constant. If the switching frequency $f_0$ is constant for PWM control, then $$V_{CMP} = \frac{1}{\gamma} \sqrt{\frac{2 V_o}{f_0 L}} \sqrt{I_o} \qquad (7)$$

As shown in Equation 7, if the output current $I_o$ changes, the voltage $V_{CMP}$ generated by the error amplifier 350 or 450 also changes as a result of regulation by the closed loop in FIG. 3 or 4.

Figure 5:
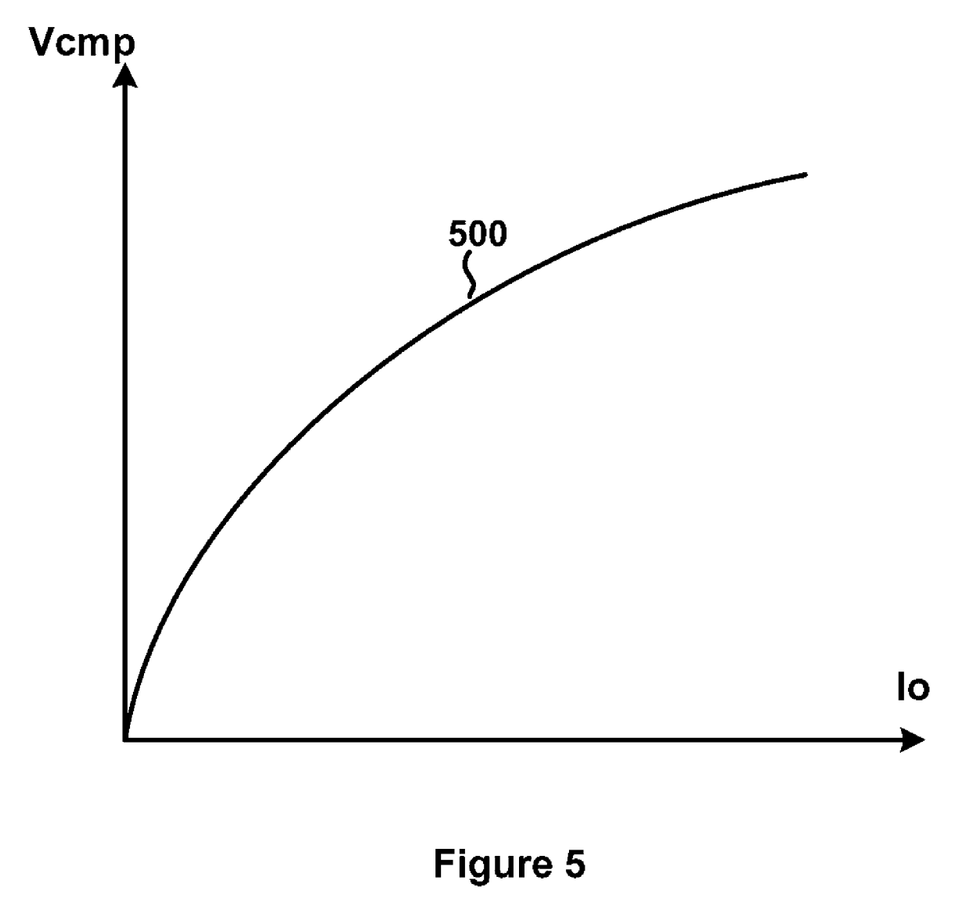
FIG. 5 is a simplified diagram showing VCMP as a function of $I_o$ for the switching-mode power conversion system under the PWM control according to an embodiment of the present invention.

FIG. 5 is a simplified diagram showing $V_{CMP}$ as a function of $I_o$ for the switching-mode power conversion system 300 or 400 under the PWM control according to an embodiment of the present invention. For example, the curve 500 is consistent with Equation 7.

In another embodiment, if the system 300 or 400 operates in the discontinuous-conduction-mode (DCM) with PFM control, the energy stored during the switch-on usually is fully delivered to the output, as shown below.

$$\frac{1}{2} f \times L \times I_{PK}^2 = V_o \times I_o \qquad (8)$$

where f is the switching frequency of the signal 332 or 432, and L is the inductance of the primary winding 370 or 470.

Additionally, $V_o$ is the output voltage of the system 300 or 400, and $I_o$ is the output current of the system 300 or 400. For example, $V_o$ is the same as $V_{out}$ as shown in FIG. 3 or 4. Also, $I_{PK}$ is the peak current of the primary winding 370.

$$\text{Moreover,} \quad f = \beta \times V_{CMP} \qquad (9)$$

where $\beta$ is a constant. If the peak current $I_{PK}$ is constant for PFM control, then $$V_{CMP} = 2 \frac{V_o \times I_o}{\beta \times L \times I_{PK}^2} \qquad (10)$$

As shown in Equation 10, the voltage $V_{CMP}$ generated by the error amplifier 350 or 450 is proportional to the output power of the system 300 or 400, and is proportional to the output current $I_o$ if the output voltage $V_o$ is constant.

Figure 6:
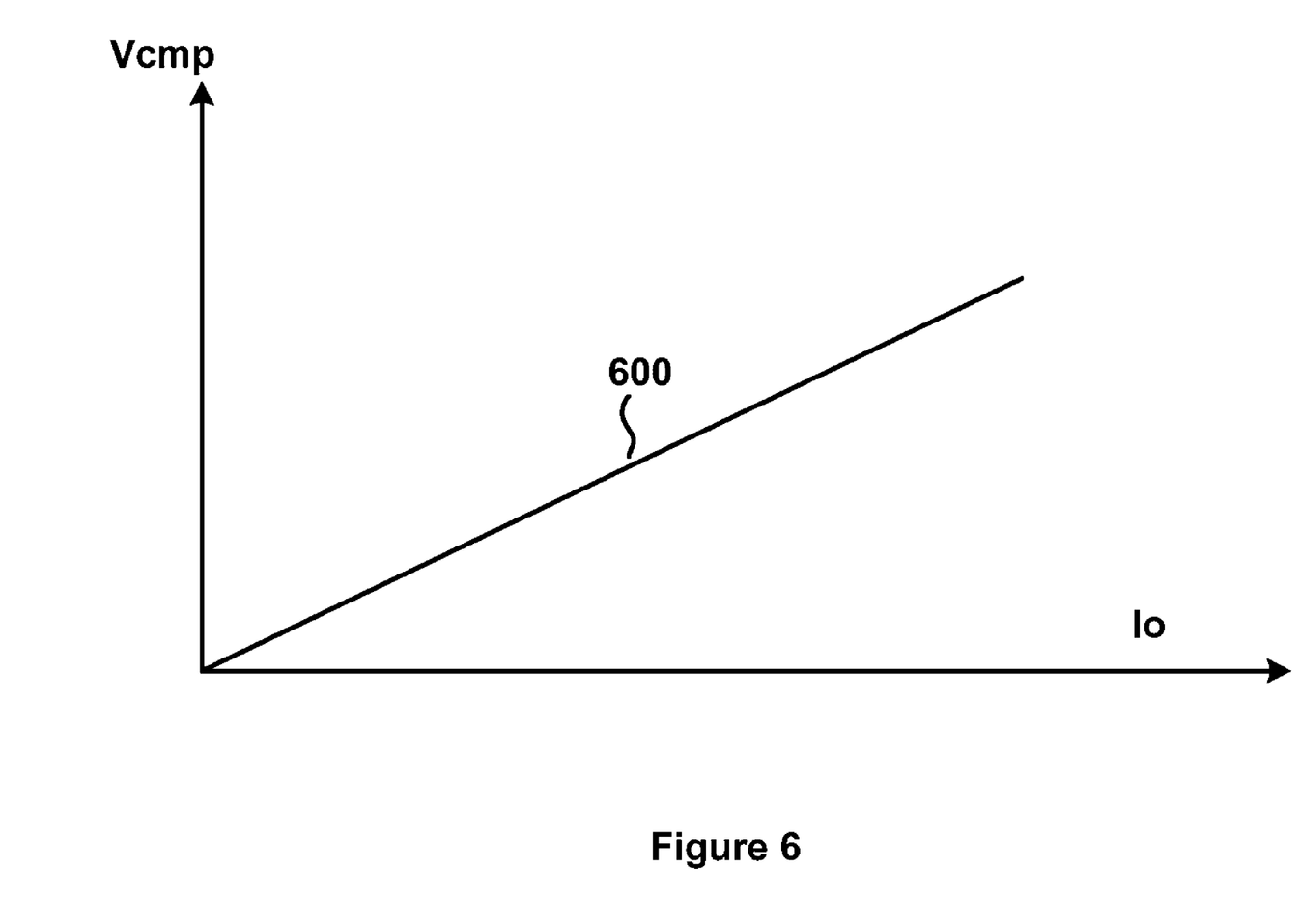
FIG. 6 is a simplified diagram showing VCMP as a function of $I_o$ for the switching-mode power conversion system under the PFM control according to an embodiment of the present invention.

FIG. 6 is a simplified diagram showing $V_{CMP}$ as a function of $I_o$ for the switching-mode power conversion system 300 or 400 under the PFM control according to an embodiment of the present invention. For example, the curve 600 is consistent with Equation 10.

As shown in FIGS. 5 and 6, $V_{CMP}$ is a monotonic function of the output current $I_o$ and thus can be used to generate compensation signals 352 and 452, represented by $\Delta V_{ref}$ in FIG. 3 and $\Delta I_{LC}$ in FIG. 4, respectively, according to certain embodiments of the present invention.

Returning to FIG. 3, for example, the compensation signal 352 is used to compensate for the voltage drops of the diode 380 (i.e., the diode D2) and the output cable line, at different output loading conditions. Thus, the output voltage $V_{out}$ can be obtained as follows.

$$V_{out} = k \times (V_{ref} + \Delta V_{ref}) + \frac{1}{n} V_{D1} - V_{D2} - I_o \times r \qquad (11)$$

where $V_{out}$ and $I_o$ are the output voltage and the output current of the system 300 respectively. Additionally, n is the turn ratio of the auxiliary winding 374 to the secondary winding 372. $V_{D1}$ and $V_{D2}$ are the forward voltages across the diodes 384 and 380 respectively. Moreover, r is the resistance of the output cable line, $V_{ref}$ is the voltage level of a reference signal 362, and $\Delta V_{ref}$ represents the compensation signal 352. As shown in FIG. 3, the compensation signal 352 depends on output loading conditions. Also, $$k = \frac{R_1 + R_2}{n \times R_2} \qquad (12)$$

where $R_1$ and $R_2$ are the resistance of the resistors 312 and 314, respectively.

$$\text{If} \quad V_{D2} = V_{D2}(0) + \Delta V_{D2}(I_o) \qquad (13)$$

then $$V_{out} = k \times V_{ref} + \frac{1}{n} V_{D1} - V_{D2}(0) - \Delta V_{D2}(I_o) - I_o \times r + k \times \Delta V_{ref} \qquad (14)$$

where $V_{D2}(0)$ denotes the forward voltage of the diode 380 with zero current that flows through the diode 380.

If $k \times \Delta V_{ref} = \Delta V_{D2}(I_o) + I_o \times r$  (15)

then $V_{out} = k \times V_{ref} + \frac{1}{n} V_{D1} - V_{D2}(0)$  (15)

As shown in Equation 16, the output voltage $V_{out}$ is independent of the output current $I_o$, if Equation 15 is satisfied according to certain embodiments of the present invention.

Figure 7:
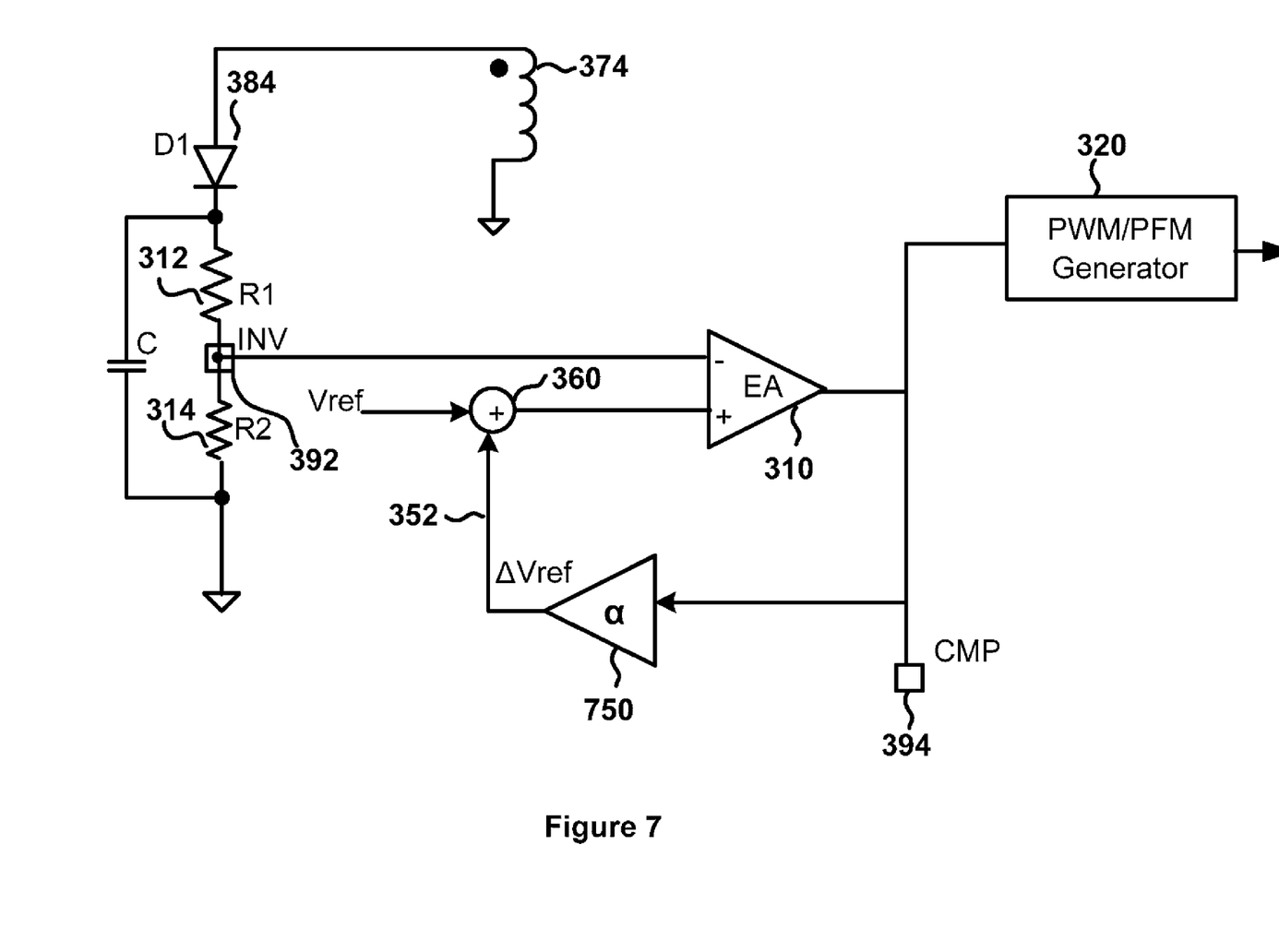
FIG. 7 is a simplified diagram showing certain components for load compensation in the switching-mode power conversion system according to an embodiment of the present invention.

FIG. 7 is a simplified diagram showing certain components for load compensation in the switching-mode power conversion system 300 according to an embodiment of the present invention. This diagram is merely an example, which should not unduly limit the scope of the claims. One of ordinary skill in the art would recognize many variations, alternatives, and modifications.

As shown in FIGS. 3 and 7, $V_{CMP}$ is generated by the error amplifier 310 and received by the load compensation component 350. For example, the load compensation component 350 includes a gain component 750, such as an amplifier. In one embodiment, the gain component 750 converts $V_{CMP}$ to $\Delta V_{ref}$, which is the voltage level of the compensation signal 352, as follows.

$$\Delta V_{REF} = \alpha V_{CMP} \quad (17)$$

where $\alpha$ is the gain of the gain component 750. According to certain embodiments, $\alpha$ is predetermined in order to approximately satisfy Equation 15, so that $V_{out}$ can be approximated by Equation 16 and substantially independent of the output current $I_o$.

For example, $\Delta V_{REF}$ increases as the output current increases. In another example, $\Delta V_{ref}$ is used to modulate the reference voltage $V_{ref}$ in order to compensate for the voltage loss due to the output current.

According to another embodiment of the present invention, a switching-mode power conversion system includes a primary winding configured to receive an input voltage, and a secondary winding coupled to the primary winding and configured to, with one or more first components, generate, at an output terminal, an output voltage and an output current. Additionally, the system includes an auxiliary winding coupled to the secondary winding and configured to, with one or more second components, generate, at a first terminal, a detected voltage. Moreover, the system includes an error amplifier configured to receive the detected voltage and a first reference voltage and generate an amplified voltage based on at least information associated with a difference between the detected voltage and the first reference voltage. Also, the system includes a compensation component configured to receive the amplified voltage and generate a second reference voltage based on at least information associated with the amplified voltage, and a summation component configured to receive the second reference voltage and a predetermined reference voltage and generate the first reference voltage. Additionally, the system includes a signal generator configured to receive at least the amplified voltage and generate one or more control signals based on at least information associated with the amplified voltage, a gate driver configured to receive the one or more control signals and generate a drive signal based on at least information associated with the one or more control signals, and a switch configured to receive the drive signal and affect a first current flowing through the primary winding. The one or more first components include a first diode, through at least the first diode the secondary winding being coupled to the output terminal. The compensation component is further configured to generate the second reference voltage such that the output voltage is substantially independent of the output current. For example, the switching-mode power conversion system is implemented according to at least FIG. 3. In another example, the switching-mode power conversion system is implemented according to at least FIGS. 3 and 7.

In another example, the compensation component includes a gain component associated with a predetermined gain, and the second reference voltage is equal to the amplified voltage multiplied by the predetermined gain in magnitude. In yet another example, the signal generator is configured for pulse-width modulation and/or pulse-frequency modulation. In yet another example, the amplified voltage increases with the output current in magnitude. In yet another example, the one or more first components further include a cable line, through at least the first diode and the cable line, the secondary winding being coupled to the output terminal. In yet another example, the one or more second components include a second diode, a first resistor, and a second resistor, the first resistor and the second resistor both coupled to the first terminal. In yet another example, the error amplifier, the compensation component, the summation component, the signal generator, and the gate driver are located on a chip. In yet another example, the chip includes the first terminal and a second terminal, the second terminal being coupled to the error amplifier, the compensation component, and the signal generator. In yet another example, the signal generator includes the PWM/PFM generator 320 and the logic control component 325.

According to yet another embodiment of the present invention, a method for regulating an output voltage by a switching-mode power conversion system includes receiving an input voltage by a primary winding. Additionally, the method includes generating, at an output terminal, an output voltage and an output current based on at least information associated with the input voltage, by a secondary winding and one or more first components, the one or more first components including a first diode, through at least the first diode the secondary winding being coupled to the output terminal. Moreover, the method includes generating, at a first terminal, a detected voltage based on at least information associated with the output voltage, by an auxiliary winding and one or more second components. Also, the method includes receiving the detected voltage and a first reference voltage by an error amplifier, generating an amplified voltage based on at least information associated with a difference between the detected voltage and the first reference voltage, and receiving the amplified voltage by a compensation component. Additionally, the method includes generating a second reference voltage based on at least information associated with the amplified voltage, receiving the second reference voltage and a predetermined reference voltage by a summation component, and generating the first reference voltage equal to the second reference voltage and a predetermined reference voltage in magnitude. Moreover, the method includes receiving at least the amplified voltage by a signal generator, generating one or more control signals based on at least information associated with the amplified voltage, receiving the one or more control signals by a gate driver, and generating a drive signal based on at least information associated with the one or more control signals. Also, the method includes receiving the drive signal by a switch, and affecting a first current flowing through the primary winding, based on at least information associated with the drive signal. The process for generating a second reference voltage is performed such that the output voltage is substantially independent of the output current. For example, the method for regulating an output voltage is implemented according to at least FIG. 3. In another example, the switching-mode power conversion system is implemented according to at least FIGS. 3 and 7. In yet another example, the second reference voltage is equal to the amplified voltage multiplied by a predetermined gain in magnitude. In yet another example, the signal generator includes the PWM/PFM generator 320 and the logic control component 325.

Returning to FIG. 4, for example, the compensation signal 452 is used to compensate for the voltage drops of the diode 480 (i.e., the diode D2) and the output cable line, at different output loading conditions. Thus, the output voltage $V_{out}$ can be obtained as follows.

$$V_{out} = k \times V_{ref} + \frac{1}{n} V_{D1} - V_{D2}(I_o) - I_o \times r + k \frac{R_1 \times R_2}{R_1 + R_2} \Delta I_{LC} \quad (18)$$

where $V_{out}$ and $I_o$ are the output voltage and the output current of the system 400 respectively. Additionally, n is the turn ratio of the auxiliary winding 474 to the secondary winding 472. $V_{D1}$ and $V_{D2}$ are the forward voltages across the diodes 484 and 480 respectively. Moreover, r is the resistance of the output cable line, $V_{ref}$ is the voltage level of a reference signal 462, and $\Delta I_{LC}$ represents the compensation signal 452. As shown in FIG. 4, the compensation signal 452 depends on output loading conditions. Also, $$k = \frac{R_1 + R_2}{n \times R_2} \quad (19)$$

where $R_1$ and $R_2$ are the resistance of the resistors 412 and 414, respectively.

$$\text{If } V_{D2} = V_{D2}(0) + \Delta V_{D2}(I_0) \quad (20)$$
then
$$V_{out} = k \times V_{ref} + \frac{1}{n} V_{D1} - V_{D2}(0) - \Delta V_{D2}(I_o) - I_o \times r + k \frac{R_1 \times R_2}{R_1 + R_2} \Delta I_{LC} \quad (21)$$

where $V_{D2}(0)$ denotes the forward voltage of the diode 480 with zero current that flows through the diode 480.

$$\text{If } k \frac{R_1 \times R_2}{R_1 + R_2} \Delta I_{LC} = \Delta V_{D2}(I_o) + I_o \times r \quad (22)$$

$$\text{then } V_{out} = k \times V_{ref} + \frac{1}{n} V_{D1} - V_{D2}(0) \quad (23)$$

As shown in Equation 23, the output voltage $V_{out}$ is independent of the output current $I_o$, if Equation 22 is satisfied according to certain embodiments of the present invention. For example, changing $R_1$ and $R_2$ while keeping their ratio the same would change $\Delta I_{LC}$ that is required to satisfy Equation 22. In another example, $\Delta I_{LC}$, with at least resistors $R_1$ and $R_2$, generates an offset voltage at the terminal 492 in order to compensate for the voltage drops across the diode 480 and the output cable line.

Figure 8:
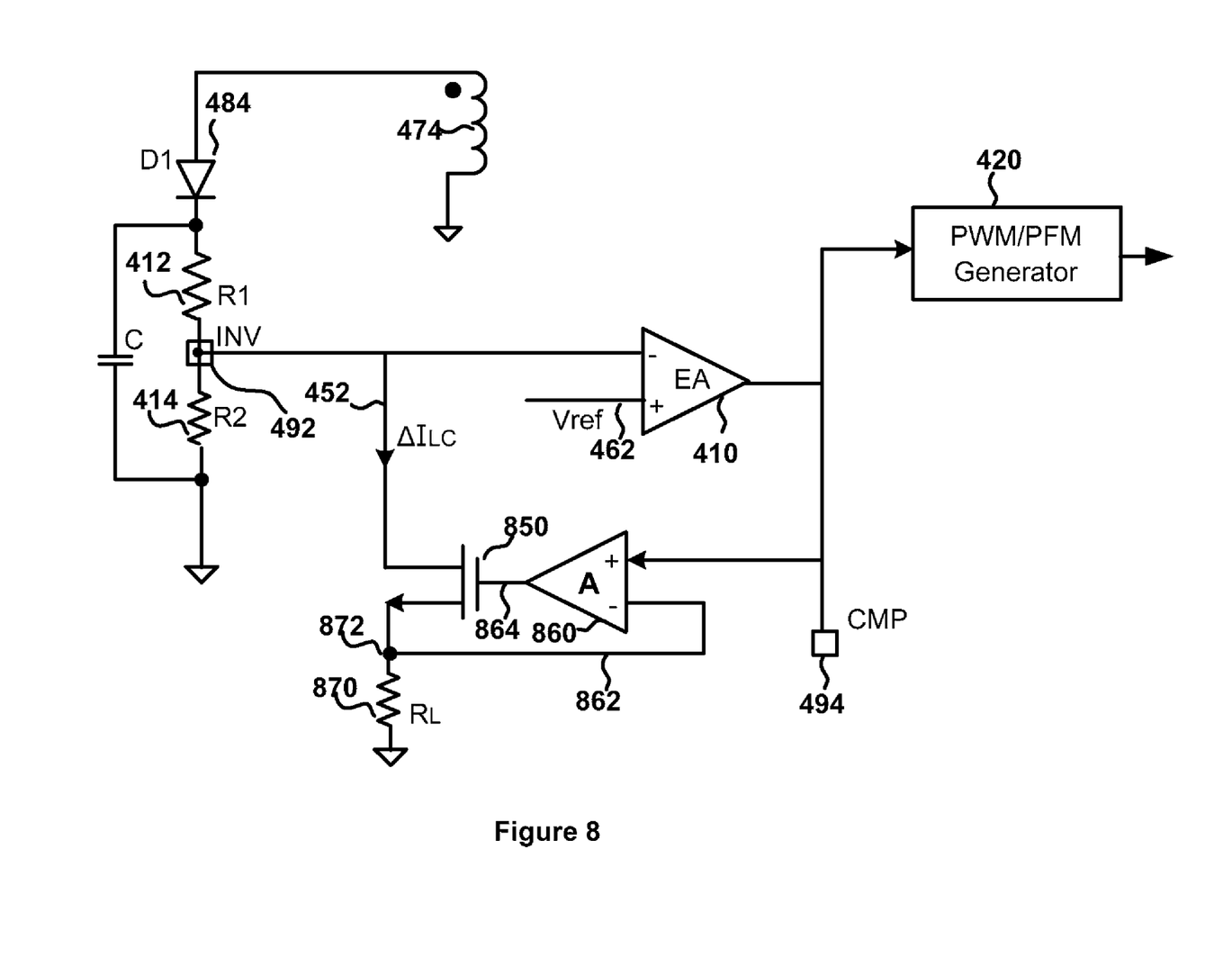
FIG. 8 is a simplified diagram showing certain components for load compensation in the switching-mode power conversion system according to an embodiment of the present invention.

FIG. 8 is a simplified diagram showing certain components for load compensation in the switching-mode power conversion system 400 according to an embodiment of the present invention. This diagram is merely an example, which should not unduly limit the scope of the claims. One of ordinary skill in the art would recognize many variations, alternatives, and modifications.

As shown in FIGS. 4 and 8, $V_{CMP}$ is generated by the error amplifier 410 and received by the load compensation component 450. For example, the load compensation component 450 includes a transistor 850, an amplifier 860, and a resistor 870. In another example, the amplifier 860 receives $V_{CMP}$ and a voltage signal 862 from a node 872, determines a difference between $V_{CMP}$ and the voltage signal 862, and generate an amplified voltage 864. The amplified voltage 864 is received by the gate of the transistor 850. As shown in FIG. 8, the source of the transistor 850 is connected to the resistor 870 at the node 872, and the drain of the transistor 850 generates the current $\Delta I_{LC}$ that flows between the terminal 492 and the drain of the transistor 850.

In one embodiment, $V_{CMP}$ is converted to $\Delta I_{LC}$ by the transistor 850, the amplifier 860, and the resistor 870, as follows.

$$\Delta I_{LC} = \frac{V_{CMP}}{R_L} \quad (24)$$

$$\text{or } \Delta I_{LC} = G_m \times V_{CMP} \quad (25)$$

where $R_L$ is the resistance of the resistor 870, and $G_m$ is the corresponding conductance. According to certain embodiments, $R_L$ is predetermined in order to approximately satisfy Equation 22, so that $V_{out}$ can be approximated by Equation 23 and substantially independent of the output current $I_o$.

According to another embodiment of the present invention, a switching-mode power conversion system includes a primary winding configured to receive an input voltage, and a secondary winding coupled to the primary winding and configured to, with one or more first components, generate, at an output terminal, an output voltage and an output current. Additionally, the system includes an auxiliary winding coupled to the secondary winding and configured to, with at least one or more second components, generate, at a first terminal, a detected voltage. Moreover, the system includes an error amplifier configured to receive the detected voltage and a predetermined reference voltage and generate an amplified voltage based on at least information associated with a difference between the detected voltage and the predetermined reference voltage. Also, the system includes a compensation component configured to receive the amplified voltage and generate a compensation current based on at least information associated with the amplified voltage, the compensation current flowing between the first terminal and the compensation component. Additionally, the system includes a signal generator configured to receive at least the amplified voltage and generate one or more control signals based on at least information associated with the amplified voltage, a gate driver configured to receive the one or more control signals and generate a drive signal based on at least information associated with the one or more control signals, and a switch configured to receive the drive signal and affect a first current flowing through the primary winding. The one or more first components include a first diode, through at least the first diode the secondary winding being coupled to the output terminal. The compensation component is further configured to generate the compensation current such that the output voltage is substantially independent of the output current. For example, the switching-mode power conversion system is implemented according to at least FIG. 4. In another example, the switching-mode power conversion system is implemented according to at least FIGS. 4 and 8.

In yet another example, the compensation component includes a compensation transistor, a compensation amplifier, and a compensation resistor, the compensation resistor being associated with a compensation resistance, the compensation amplifier is configured to receive at least the amplified voltage and coupled to both the compensation transistor and the compensation resistor, the compensation transistor is coupled to at least the compensation resistor and configured to generate the compensation current, and the compensation current is equal to the amplified voltage divided by the compensation resistance in magnitude.

In yet another example, the signal generator is configured for pulse-width modulation and/or pulse-frequency modulation. In yet another example, the amplified voltage increases with the output current in magnitude. In yet another example, the one or more first components further include a cable line, through at least the first diode and the cable line, the secondary winding being coupled to the output terminal. In yet another example, the one or more second components include a second diode, a first resistor, and a second resistor, the first resistor and the second resistor both coupled to the first terminal. In yet another example, the error amplifier, the compensation component, the signal generator, and the gate driver are located on a chip. In yet another example, the chip includes the first terminal and a second terminal, the second terminal being coupled to the error amplifier, the compensation component, and the signal generator. In yet another example, the signal generator includes the PWM/PFM generator 420 and the logic control component 425.

According to yet another embodiment of the present invention, a method for regulating an output voltage by a switching-mode power conversion system, the method includes receiving an input voltage by a primary winding. Additionally, the method includes generating, at an output terminal, an output voltage and an output current based on at least information associated with the input voltage, by a secondary winding and one or more first components, the one or more first components including a first diode, through at least the first diode the secondary winding being coupled to the output terminal. Moreover, the method includes generating, at a first terminal, a detected voltage based on at least information associated with the output voltage, by an auxiliary winding and one or more second components. Also, the method includes receiving the detected voltage and a predetermined reference voltage by an error amplifier, generating an amplified voltage based on at least information associated with a difference between the detected voltage and the predetermined reference voltage, and receiving the amplified voltage by a compensation component. Additionally, the method includes generating a compensation current based on at least information associated with the amplified voltage, the compensation current flowing between the first terminal and the compensation component. Moreover, the method includes receiving at least the amplified voltage by a signal generator, generating one or more control signals based on at least information associated with the amplified voltage, receiving the one or more control signals by a gate driver, and generating a drive signal based on at least information associated with the one or more control signals. Also, the method includes receiving the drive signal by a switch, and affecting a first current flowing through the primary winding, based on at least information associated with the drive signal. The process for generating a compensation current is performed such that the output voltage is substantially independent of the output current. For example, the method for regulating an output voltage is implemented according to at least FIG. 4. In another example, the switching-mode power conversion system is implemented according to at least FIGS. 4 and 8.

In yet another example, the compensation current is equal to the amplified voltage divided by a compensation resistance in magnitude, the compensation resistance being associated with a compensation resistor, the compensation resistor being at least a part of the compensation component. In yet another example, the compensation current is equal to the amplified voltage multiplied by a compensation conductance in magnitude, the compensation conductance being associated with a conductance component, the conductance component being at least a part of the compensation component. In yet another example, the signal generator includes the PWM/PFM generator 420 and the logic control component 425.

Many benefits are achieved by way of the present invention over conventional techniques. Certain embodiments of the present invention reduce parts count and/or system cost. Some embodiments of the present invention improve reliability and/or efficiency. Certain embodiments of the present invention simplify circuit designs. Some embodiments of the present invention improve load regulation of the flyback power conversion system with pulse-width-modulation (PWM) control and primary-side regulation.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A switching-mode power conversion system, the system comprising:
   a primary winding configured to receive an input voltage;
   a secondary winding coupled to the primary winding and configured to, with one or more first components, generate, at an output terminal, an output voltage and an output current;
   an auxiliary winding coupled to the secondary winding and configured to, with at least one or more second components, generate, at a first terminal, a detected voltage;
   an error amplifier configured to receive the detected voltage and a predetermined reference voltage and generate an amplified voltage based on at least information associated with a difference between the detected voltage and the predetermined reference voltage;
   a compensation component configured to receive the amplified voltage and generate a compensation current based on at least information associated with the amplified voltage, the compensation current flowing between the first terminal and the compensation component;
   a signal generator configured to receive at least the amplified voltage and generate one or more control signals based on at least information associated with the amplified voltage;
   a gate driver configured to receive the one or more control signals and generate a drive signal based on at least information associated with the one or more control signals; and
   a switch configured to receive the drive signal and affect a first current flowing through the primary winding;
   wherein:
      the one or more first components include a first diode, through at least the first diode the secondary winding being coupled to the output terminal;
      the compensation component is further configured to generate the compensation current such that the output voltage is substantially independent of the output current;
   wherein:
      the compensation component includes a compensation transistor, a compensation amplifier, and a compensation resistor, the compensation resistor being associated with a compensation resistance;

the compensation amplifier is configured to receive at least the amplified voltage and coupled to both the compensation transistor and the compensation resistor;

the compensation transistor is coupled to at least the compensation resistor and configured to generate the compensation current; and the compensation current is equal to the amplified voltage divided by the compensation resistance in magnitude.

2. The system of claim 1 wherein the signal generator is configured for pulse-width modulation.

3. The system of claim 2 wherein the amplified voltage increases with the output current in magnitude.

4. The system of claim 1 wherein the one or more first components further include a cable line, through at least the first diode and the cable line, the secondary winding being coupled to the output terminal.

5. The system of claim 4 wherein the one or more second components include a second diode, a first resistor, and a second resistor, the first resistor and the second resistor both coupled to the first terminal.

6. The system of claim 1 wherein the error amplifier, the compensation component, the signal generator, and the gate driver are located on a chip.

7. The system of claim 6 wherein the chip includes the first terminal and a second terminal, the second terminal being coupled to the error amplifier, the compensation component, and the signal generator.

8. The system of claim 1 wherein:
the compensation amplifier includes a first amplifier input terminal and a second amplifier input terminal, and an amplifier output terminal;
the compensation transistor includes a first transistor terminal, a second transistor terminal, and a third transistor terminal;
the compensation resistor includes a first resistor terminal and a second resistor terminal;
the first amplifier input terminal is configured to receive at least the amplified voltage;
the first transistor terminal is configured to receive the compensation current;
the second transistor terminal is coupled to the amplifier output terminal;
the third transistor terminal is coupled to the first resistor terminal and the second amplifier input terminal; and
the second resistor terminal is biased to a voltage.

9. The system of claim 1 wherein the signal generator is further configured to receive a current sensing signal associated with the first current.

10. The system of claim 1 wherein the signal generator is configured for pulse-frequency modulation.

11. The system of claim 10 wherein the amplified voltage increases with the output current in magnitude.

12. A controller for a power conversion system, the controller comprising:
an error amplifier configured to receive a predetermined reference voltage and a detected voltage from a first terminal and generate an amplified voltage based on at least information associated with the detected voltage and the predetermined reference voltage;
a compensation component configured to receive the amplified voltage and generate a compensation current based on at least information associated with the amplified voltage, the compensation current flowing between the first terminal and the compensation component;
a signal generator configured to receive at least the amplified voltage and generate one or more signals based on at least information associated with the amplified voltage; and
a gate driver configured to receive the one or more signals and output a drive signal to a switch based on at least information associated with the one or more signals in order to affect a first current flowing through a primary winding of the power conversion system;
wherein:
the compensation component includes a compensation transistor, a compensation amplifier, and a compensation resistor;
the compensation amplifier is configured to receive at least the amplified voltage and coupled to both the compensation transistor and the compensation resistor; and
the compensation transistor is coupled to at least the compensation resistor and configured to generate the compensation current.

13. The controller of claim 12 wherein the compensation component is further configured to generate the compensation current such that an output voltage is substantially independent of an output current, the output voltage and the output current being generated by at least a secondary winding coupled to the primary winding.

14. The controller of claim 13 wherein the signal generator is configured for pulse-width modulation.

15. The controller of claim 14 wherein the amplified voltage increases with the output current in magnitude.

16. The controller of claim 13 wherein the signal generator is configured for pulse-frequency modulation.

17. The controller of claim 16 wherein the amplified voltage increases with the output current in magnitude.

18. The controller of claim 12 wherein the error amplifier, the compensation component, the signal generator, and the gate driver are located on a chip.

19. The controller of claim 18 wherein the chip includes the first terminal and a second terminal, the second terminal being coupled to the error amplifier, the compensation component, and the signal generator.

20. The controller of claim 12 wherein:
the compensation amplifier includes a first amplifier input terminal and a second amplifier input terminal, and an amplifier output terminal;
the compensation transistor includes a first transistor terminal, a second transistor terminal, and a third transistor terminal;
the compensation resistor includes a first resistor terminal and a second resistor terminal;
the first amplifier input terminal is configured to receive at least the amplified voltage;
the first transistor terminal is configured to receive the compensation current;
the second transistor terminal is coupled to the amplifier output terminal;
the third transistor terminal is coupled to the first resistor terminal and the second amplifier input terminal; and
the second resistor terminal is biased to a voltage.

21. The controller of claim 12 wherein the signal generator is further configured to receive a current sensing signal associated with the first current.

22. The controller of claim 12 wherein:
the compensation resistor is associated with a compensation resistance; and
the compensation current is equal to the amplified voltage divided by the compensation resistance in magnitude.

* * * * *